United States Patent [19]

Treadwell et al.

[11] 4,043,949

[45] Aug. 23, 1977

[54] OXIDATIVE STABILITY OF FLEXIBLE POLYURETHANE FOAMS

[75] Inventors: Kenneth Treadwell, Rahway; Bernard G. Kushlefsky, Edison, both of N.J.; Robert V. Russo, Brooklyn, N.Y.

[73] Assignee: M&T Chemicals Inc., Greenwich, Conn.

[21] Appl. No.: 556,011

[22] Filed: Mar. 6, 1975

[51] Int. Cl.$^2$ ............... C08G 18/18; C08G 18/14; C08G 18/24
[52] U.S. Cl. ............... 260/2.5 AC; 260/45.75 J; 260/45.75 S; 260/45.75 T
[58] Field of Search ............... 260/2.5 AB, 45.75 T, 260/45.75 S, 45.75 J, 2.5 AC

[56] References Cited

U.S. PATENT DOCUMENTS

| | | | |
|---|---|---|---|
| 3,148,162 | 9/1964 | Gmitter et al. | 260/2.5 BB |
| 3,582,501 | 6/1971 | Hostettler et al. | 260/2.5 AB |
| 3,620,985 | 11/1971 | Larkin et al. | 260/2.5 AC |
| 3,808,162 | 4/1974 | Allen et al. | 260/77.5 AB |
| 3,822,223 | 7/1974 | Gemeinhardt et al. | 260/2.5 AC |
| 3,836,488 | 9/1974 | Pruitt et al. | 260/2.5 AC |

*Primary Examiner*—H.S. Cockeram
*Attorney, Agent, or Firm*—Robert P. Auber; Kenneth G. Wheeless; Robert Spector

[57] ABSTRACT

Cellular polyurethane exhibiting excellent thermal and oxidative stability can be prepared using specified methyl-, allyl-, phenyl- or benzyltin compounds as the polymerization catalyst. These catalysts are hydrolytically stable over extended periods of time, and can therefore be incorporated into precursors or masterbatches for polyurethanes that contain water as the foaming agent.

5 Claims, No Drawings

OXIDATIVE STABILITY OF FLEXIBLE POLYURETHANE FOAMS

BACKGROUND

This invention relates to the preparation of polyurethane foams. This invention further relates to the use of certain organotin catalysts to prepare urethane foams that exhibit improved hydrolytic and oxidative stability relative to products obtained using other organotin catalysts.

Flexible polyurethane foams are widely used in the manufacture of furniture, particularly seat cushions, and as packaging material for delicate instruments and other articles that are susceptible to damage during handling and transit. If the foam is incorporated into a piece of furniture or other durable product, the foam must withstand exposure of several years or longer to elevated temperatures, atmospheric oxygen, or both without undergoing significant degradation as evidenced by a gradual loss of structural strength, which may culminate in disintegration of the foam.

It is well known to prepare cellular polyurethanes by reacting polyols containing two or more reactive hydrogen atoms, as determined by the Zerewitinoff method, with polyfunctional isocyanates in the presence of a polymerization or gel catalyst and a blowing agent such as water or a relatively low boiling fluorinated hydrocarbon. A surfactant is often included in the reaction mixture to obtain the desired small, uniform cell size within the foam.

U.S. Pat. No. 3,620,985 discloses that both divalent and tetravalent tin compounds are effective gel catalysts for cellular polyurethanes. The divalent tin compounds, exemplified by stannous salts of carboxylic acids, such as stannous octoate, are so susceptible to oxidation that they decompose readily in the presence of air. Special handling and storage of these stannous compounds is therefore required to retain their activity as catalysts. Compounds of the formula $R_aSnX_{4-a}$ wherein R is typically butyl or other alkyl radical containing between 2 and 20 carbon atoms and X is halogen or other anionic radical are less than satisfactory for preparing flexible foams that are exposed to atmospheric oxygen, elevated temperatures, i.e. above about 50° C. or both over extended periods of time. Under these conditions the foams may lose resilience and structural integrity, sometimes to the extent that they disintegrate when compressed. This is particularly true for those foams derived from polyols that are reaction products of propylene oxide and glycerine. These polyols may also contain end groups derived from ethylene oxide. Polyurethanes derived from polyols that contain side chains resulting from the graft polymerization of acrylonitrile, styrene or other vinyl monomer onto a poly (propylene oxide) backbone are usually less susceptible to oxidative and thermal degradation, and are therefore employed to prepare high resiliency foams. However, in the presence of conventional organotin gel catalysts even these products undergo a significant decrease in residiency following prolonged espoxures to oxygen and/or heat. Measuring the loss in resiliency that occurs during heating constitutes a commercially accepted test procedure for evaluating cellular polymers. The experimental procedure for conducting this test is available as ASTM Test D-1564, suffix A, also referred to as the indent load deflection test, and is described in the accompanying examples.

An objective of this invention is to improve the resistance to oxidative degradation of polyurethane foams prepared using tetravalent organotin compounds as the gel catalyst.

Surprisingly it has now been found that certain organotin gel catalysts wherein the hydrocarbon radicals bonded to the tin atom are methyl, allyl, phenyl or benzyl are unique in that they do not adversely affect the oxidative stability of flexible polyurethane foams.

SUMMARY OF THE INVENTION

This invention provides a method for preparing a flexible cellular polyurethane of improved oxidative stability by reacting a polyol containing at least two active hydrogen atoms per molecule, as determined by the Zerewitinoff method, with a stoichiometric excess of a polyfunctional isocyanate, the reaction being conducted in the presence of a blowing agent and an effective amount of a gel catalyst of the formula

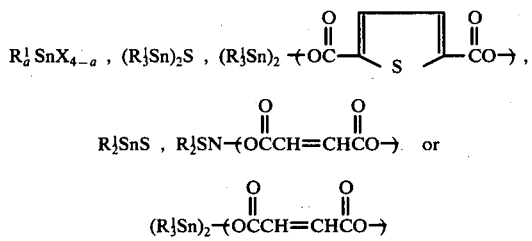

wherein $R^1$ represents a methyl, allyl, phenyl, substituted phenyl or benzyl radical, X is a monovalent radical selected from the group consisting of

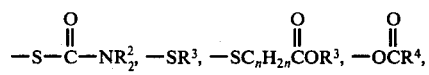

chlorine and bromine, $R_2$ and $R^3$ each represents an alkyl radical containing between 1 and 20 carbon atoms, a cycloalkyl, phenylalkyl, alklphenyl or phenyl radical, $R^4$ represents an alkyl radical containing between 1 and 20 carbon atoms, a cycloalkyl or phenyl radical, a represents the integer 1, 2 or 3 and n represents an integer between 1 and 12, inclusive.

DETAILED DESCRIPTION OF THE INVENTION

The present gel catalysts are useful for preparing flexible polyurethane foams from substantially all of the known polyols, polyfunctional isocyanates and blowing agents. The concentration of gel catalyst is usually between 0.005 and 1%, based on the weight of polyol. The present gel catalysts are methyl-, allyl-, phenyl- and benzyltin sulfides, maleates, dithiocarbamates, mercaptides, mercaptocarboxylates, halides (chlorides and bromides) and carboxylates, as defined in the present specification and accompanying claims. When the anionic radical is sulfur or a maleic acid residue

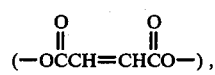

the compound preferably contains two or three hydrocarbon radicals bonded to the tin atom. Derivatives of 2,5-thiophene dicarboxylic acid,

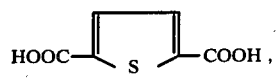

are triorganotin compounds. Compounds containing any of the other anionic radicals represented by X in the foregoing formula have one, two or three hydrocarbon radicals bonded to the tin atom. If a phenyl, alkylphenyl or phenylalkyl radical forms part of the anionic radical, such as would be present in a substituted benzoic residue, the phenyl ring may contain one or more inert substituents, including halogen atoms and nitro radicals (—NO$_2$). The corresponding carboxylic acid or other compounds containing the desired substituents are either commercially available or can be readily synthesized using known procedures.

The polyfunctional isocyanates used to prepare polyurethanes include both polyisocyanates and polyisothiocyanates. While the invention is described with specific references to the reaction of certain diisocyanates, it is generically applicable to the reaction of any compound containing two or more —N=C=G radicals wherein G is oxygen or sulfur. Compounds within this generic definition include polyisocyanates and polyisothiocyanates of the formula R$^5$(NCG)$_x$ in which x is 2 or more. R$^5$ can be alkylene, substituted alkylene, arylene, substituted arylene or other divalent hydrocarbon radical that may optionally contain one or more aryl-NCG bonds and one or more alkyl-NCG bonds.

Although a variety of organic polyisocyanates containing 3 or more isocyanate radicals per molecule can be used in the practice of this invention, diisocyanates are usually preferred in flexible foam formulations. Suitable isocyanates include alkylene diisocyanates such as hexamethylene diisocyanate, and decamethylene diisocyanate, the isomeric tolylene diisocyanates and naphthalene diisocyanates, 4,4'-diphenylmethane diisocyanate and mixtures of two or more of the foregoing diisocyanates. Triisocyanates obtained by reacting 3 moles of an arylene diisocyanate for each mole of a triol, e.g. the products formed from 3 moles of tolylene diisocyanate and 1 mole of hexane triol may also be present in the reaction mixture. A preferred polyisocyanate is a mixture of tolylene diisocyanates containing 80 percent by weight of the 2,4-isomer and 20 percent of the 2,6-isomer. Other suitable polyfunctional isocyanates include hexamethylene diisocyanate, 1,8-diisocyanate-p-methane, xylylene diisocyanate, 1-methyl-2,4-diisocyanate-cyclohexane, phenylene diisocyanates, chlorophenylene diisocyanates, diphenylmethane-4, 4'-diisocyanate, naphthalene-naphthalene-1,5 diisocyanate, triphenyl-methane-4,4'4"-triisocyanate and xylene-α,α'-diisothiocyanate. Oligomeric and polymeric isocyanates of the general formulae (R$^7$NCG)$_x$ and [R$^7$(NCG)$_x$]$_y$, in which x and y are between 2 and 10, are also useful in the present method, as are compounds of the general formula M(NCG)$_x$ wherein x is 2 or more and M is a difunctional or polyfunctional atom or group. Examples of this type include ethylphosphonic diisocyanate, C$_2$H$_5$P(O)(NCO)$_2$, phenylphosphonic diisocyanate, C$_8$H$_5$P(NCO)$_2$, compounds containing a ≡Si-NCG group, isocyanates derived from sulfonamides (R$_7$SO$_2$-NCO), cyanic acid, and thiocyanic acid.

Flexible polyurethane foams are conventionally prepared by reacting one or more of the aforementioned isocyanates with one or more polyalkylene polyols that contain two or more active hydrogen atoms as determined by the Zerewitinoff method. Suitable polyalkylene polyols are liquids which typically exhibit an average molecular weight of between about 500 and 5000 and include hydroxyl-containing polyesters, polyethers and amides, alkylene glycols, polymercaptans, polyamines and polyisocyanate-modified alkylene glycols. These polyalkylene polyols exhibit either primary or secondary active hydroxyl groups. The class of hydroxylcontaining polyethers or polyesters includes fatty acid glycerides having hydroxyl numbers between 50 and 75, such as castor oil, hydrogenated castor oil and "blown" natural oils.

Hydroxyl-terminated polyesters, a preferred type of polyalkylene polyol, can be obtained by the esterification-condensation reaction of aliphatic dibasic carboxylic acids with glycols, triols or mixtures thereof, in proportions such that most of all of the resultant polymer chains contain terminal hydroxyl groups. Dibasic carboxylic acids suitable for preparing polyesters include aliphatic and aromatic acids such as adipic, fumaric, sebacic and the isomeric phthalic acids. The acid is reacted with a polyhydroxylated compound such as ethylene glycol, diethylene glycol or trimethylol propane, among others.

Hydroxyl-terminated polyethers, a second preferred type of polyalkylene polyol, include polyalkylene glycols, e.g. polyethylene glycols and polypropylene glycols. The molecular weight of these compounds is preferably between about 200 and 5000.

Another class of polymers having terminal reactive hydroxyl groups are lactone polymers, preferably those exhibiting molecular weights within the range of 500 to 10,000.

The present method is particularly suitable for the reaction of organic polyisocyanates with high molecular weight polyols containing two or more reactive hydroxyl radicals.

The preparation of polyether based urethane foams can be carried out by forming a prepolymer, i.e. pre-reacting molar equivalents of the hydroxyl-terminated polyether and isocyanate in the absence of water and thereafter producing a foam by the addition of excess isocyanate, water and optionally other blowing agents and one of the present gel catalysts. Alternatively, foams may be produced by the "one-shot" method in which all of the reactants and catalysts are mixed together and allowed to react in the presence of water or other blowing agent.

The polyfunctional isocyanate is typically present in an amount of 5 to 300 percent, preferably about 40 percent by weight of the polyol. Water may optionally be present as a blowing agent to react with the excess isocyanate and generate sufficient carbon dioxide to produce a foam of the desired density. The amount of water is between 1 and 10 percent, preferably between 3 and 5%, based upon the weight of the polyol.

If water is used as the blowing agents, it is usually in combination with a blowing catalyst to obtain the balance between the rates of polymerization and gas generation required to attain the desired uniform cell structure and small cell size within the foam. One part of blowing catalyst is employed for every 0.01 to 5 parts of gel catalyst. The reaction mixture optionally contains a surfactant, preferably a silicone such as a blocked dimethyl polysiloxane, to further ensure formation of the desired cell structure.

Preferred blowing catalysts are tertiary amines, employed at from 0.05 to 0.5 parts per hundred parts by weight of polyol. Examples of such blowing catalysts include triethylene diamine, bis(dimethylamine ethyl)ether, methyl dicyclohexylamine, dimethyl cyclohexylamine, N,N-dimethylpiperazine and N,N-dimethylethanolamine.

The amount of isocyanate used is usually in excess of the stoichiometric amount required to react with the active hydrogens supplied by the polyol and any water present, thereby forming urethane

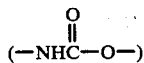

and urea

linkages in the polymer chanins. Depending upon the desired density of the urethane foam and the amount of cross linking desired, the ratio isocyanate equivalents to the equivalents of active hydrogen should be 0.8 to 1.2, respectively, and preferably between 0.9 and 1.1.

Preferably the gel catalyst or mixture of gel and blowing catalysts will be present in an amount corresponding to 0.01 to 10 parts by weight per 100 parts of polyol. The gel catalyst is present in an amount corresponding to between 0.005 and 1.0 parts by weight per 100 parts of polyol.

The following examples demonstrate the oxidative stability that distinguishes flexible foams prepared using the present organotin gel catalysts from those obtained using other organotin compounds. All parts and percentages are by weight unless otherwise specified.

EXAMPLE 1

A masterbatch or premix was prepared by combining 500 parts of a trifunctional glycerol based polypropylene glycol exhibiting an average molecular weight of 3000, 17.5 parts water, 1.5 parts N-ethyl morpholine, 1.5 parts of a 33% solution of triethylene diamine in dipropylene glycol and 5.0 parts of a poly(oxyethylene oxypropylene) siloxane available as Niax® L-550 from the Union Carbide Chemical Corporation. The mixture was stirred at high speed for about 2 minutes, then was allowed to remain undisturbed for about 16 hours, during which time a clear solution formed. A 52.55 gram aliquot of the solution was placed in a 6 oz. (177 cc.) capacity polyethylene-lined paper cup together with the gel catalyst, and stirred at high speed for five seconds, 22.5 g. of tolylene diisocyanate (80% of 2,4-isomer and 20% of 2,6-isomer) were then added and the resultant mixture poured into a one liter capacity polyethylene-lined cup. The time interval required for completion of the ensuring foam formulation was noted and is recorded in the accompanying Table I (together with the type and amount of gel catalyst employed for each of the samples.

Each of the cylindrical foam samples was cut in half lengthwise and one of the halves was tested for oxidative and thermal stability. The sample to be tested was placed in a circulating air oven at a temperature of 140° C. for 22 hours, then withdrawn from the oven and allowed to cool for between 10 and 15 minutes. A portion of the flat surface of each sample was depressed to the maximum extent and the pressure released almost immediately. Samples that were sufficiently resilient to recover their original shape without any visible damage were considered to have the test and all others were considered failures.

EXAMPLE 2

The procedure of Example 1 was followed using 300 parts of the polyol, 10.5 parts water, 0.9 parts N-ethyl morpholine, 0.9 parts of a 33% solution of triethylene diamine in dipropylene glycol and 3.0 parts of a poly(oxyethylene oxypropylene) siloxane available as Niax® L-550 from the Union Carbide Chemical Corporation. The reagents were combined in a one-liter capacity polyethylene-lined paper cup. The type and amount of gel catalyst used is reported in Table II. Following the addition of the gel catalyst, the content of the cup were mixed at high speed for 5 seconds. Tolylene diisocyanate (135 parts) was then added followed by mixing for 10 seconds. The reaction mixture was poured into a 15 × 15 × 6 inch (38 × 38 × 15 cm.) cardboard container and allowed to rise. The resultant foam was post cured for 10 minutes at 125° C., and a 13 × 15 × 2 inch (33 × 38 × 5 cm.) test specimen was cut from each bun. The test specimens were allowed to age under ambient conditions for 1 week before conditioning and testing. The indentation load deflection (ILD) was measured in accordance with ASTM D-2406 Method A. The apparatus for the test consisted of a flat circular indentor foot with an area of 50 in.² (323 cm.²) that was connected to an Instron® tensile strength tester such that the test specimen could be indented by the foot at a rate of 5.1 cm. per minute. The specimen was supported on a perforated plate having 0.6 cm. diameter holes with the centers spaced 1.9 cm. apart. The plate measured 13.5 × 15 inches (34.3 × 38 cm.) and the specimens measured 13 × 15 × 1.7 inches (32 × 38 × 4.3 cm.). The test specimen was positioned under the indentor foot and the foot lowered to compress the specimen to 75% of its original thickness. This degree of compression was maintained for 1 minute. The specimen was then further compressed at a rate of 5.1 cm./minute rate until the thickness was reduced to 35% of the original value. The specimem was then allowed to remain undisturbed on the support plate for 1 minute, after it was released from compression. The loadings required to maintain the reductions in thickness of 25% and 65% were measured and recorded at the end of the 1 minute period. The test specimens were then placed in a circulating air oven heated to a temperature of 140° C. After 22 hours the two specimens were removed from the oven and the 25 and 65% load deflections determined as previously described. The loss in the loading bearing ability of the foams which occurred during oven aging is reflected in the ILD values prior to and following heat treatment.

The amount by which ILD decreases during an accelerated aging test employing a 22 hour exposure to a temperature of 140° C. is indicative of the durability and useful lifetime of the foam. It can be seen from the data in Table II that conventional organotin gel catalysts such as dibutyltin dilaurate or dibutyltin S,S'-bis(isoctyl mercaptoacetate) cannot be used in formulations for oxidatively stable foams because of the severe loss in properties, particularly resiliency, that occurs as the foam ages.

EXAMPLE 3

This example demonstrates the ability of the present gel catalysts to improve the heat stability of high resiliency foams derived from grafted polyols.

A masterbatch formulation was prepared using 300 g. of a trifunctional polypropylene oxide polyol with end groups derived from ethylene oxide (avg. molecular weight = 6000), 200 g. of a similar polyol containing grafted polyacrylonitrile sidechains, 14 g. water, 5.0 g. of a silicone surfactant available as Niax® L-5303 from the Union Carbide Chemical Company, 0.4 g. of bis(2-dimethylaminoethyl) ether, 4.0 g. N-ethyl morpholine and 1.75 g. of a 33% by weight solution of triethylene diamine in dipropylene glycol. The resultant mixture was stirred at high speed for about 2 minutes, then allowed to remain undisturbed for about 16 hours. Two 105.4 g. aliquots of the resultant homogeneous solution were placed in separate 12 oz. (354 cc.) capacity polyethylene-lined containers together with 0.03 g. of either dibutyltin dilaurate or dimethyltin-S,S'-bis(isooctyl mercaptoacetate) and stirred for 10 seconds. A 45 g. portion of tolylene diisocyanate was then added to each aliquot, the resultant mixture stirred at high speed for 10 seconds and then poured into a 1 liter-capacity polyethylene-lined container. The rise time of the resultant foams determined as described in Example 1. The foam prepared using dibutyltin dilaurate exhibited a rise time of 80 seconds and that of the other foam was 74 seconds. The oxidative stability of the samples was determined by indentation load deflection (ILD) using ASTM test procedure D-2406 Method A. The results of this test are recorded in Table III.

TABLE I

| GEL CATALYST | CONCENTRATION (g.) | HEAT TEST RESULT | RISE TIME (Seconds) |
|---|---|---|---|
| Stannous octoate (control) | 0.15 | Pass | 79.1 |
| Dibutyltin dilaurate | 0.12 | Fail | 88 |
| Dibutyltin bis(dibutyldithiocarbamate)[A] | 0.23 | Fail | 117 |
| Butyltin tris(dibutyldithiocarbamate)[A] | 0.28 | Fail | 84 |
| Dibutyltin-S,S'-bis(isooctyl mercaptoacetate) | 0.23 | Fail | 57 |
| Dibutyltin bis(isooctyl maleate) | 0.25 | Fail | 80 |
| Bis(tributyltin)sulfide | 0.19 | Fail | 73 |
| Octyltin-S,S',S''-tris(isooctyl mercaptoacetate) | 0.30 | Fail | 83 |
| Tributyltin methacrylate | 0.13 | Fail | 89 |
| Bis(dibutylacetoxytin)oxide[A] | 0.11 | Fail | 61 |
| Dibutyltin bis(benzyl mercaptide) | 0.16 | Fail | 60 |
| Diallyltin-S,S'-bis(isooctyl mercaptoacetate) | 0.25 | Pass | 127 |
| Diallyltin dibenzoate | 0.25 | Pass | 161 |
| Dibenzyltin bis(dibutyldithiocarbamate) | 0.25 | Pass | 125 |
| Diallyltin sulfide | 0.13 | Pass | 130 |
| Diallyltin maleate[B] | 0.12 | Pass | 137 |
| Diallyltin dilaurate | 0.21 | Pass | 111 |
| Diphenyltin sulfide[C] | 0.11 | Pass | 87 |
| Triphenyltin 3-amino-2,5-dichlorobenzoate[A] | 0.2 | Pass | 91.7 |
| Bis(triphenyltin)thiophene-2,5-dicarboxylate[C] | 0.15 | Pass | 90.7 |
| Diphenyltin bis(dibutyldithiocarbamate) | 0.23 | Pass | 180 |
| Methyltin-S,S',S''-tris(isooctyl mercaptoacetate) | 0.27 | Pass | 111 |
| Dimethyltin-S,S'-bis(isooctyl mercaptoacetate) | 0.20 | Pass | 88 |
| Methyltin-S,S',S'''-tris(isooctyl mercaptoacetate) | 0.26 | Pass | 100 |
| Dimethyltin-S,S'-bis(2,3 dibromopropyl-mercaptoacetate) | 0.26 | Pass | 96 |
| Dimethyltin bis(dibutyldithiocarbamate) | 0.2 | Pass | 98 |
| Dimethyltin dichloride[D] | 0.8 | Pass | 113 |

NOTES
[A] As a 10% solution in methyl ethyl ketone
[B] As a 10% solution in N,N-dimethyl formamide
[C] As a 10% solution in N-methyl-2-pyrrolidinone
[D] As a 10% solution in water

TABLE II

| Catalyst | Concentration | Rise | ILD Before Aging 25%/65% Deflection/Deflection | ILD After Aging 25%.65% Deflection/Deflection |
|---|---|---|---|---|
| Dibutyltin-dilaurate | 0.20 | 72 | 38/61 | 7/17 |
| Dibutyltin bis-IOMA | 0.20 | 69 | 36/57 | 11/18 |
| Dimethyltin bis IOMA | 0.20 | 80 | 42/67 | 35/58 |
| Diallyltin bis IOMA | 0.20 | 85 | 39/73 | 40/74 |

IOMA = Isooctyl mercaptoacetate

TABLE III

| Gel Catalyst | Indentation Load Deflection Before Heating 25% Deflection | Indentation Load Deflection Before Heating 65% Deflection | Indentation Load Deflection After Heating 25% Deflection | Indentation Load Deflection After Heating 65% Deflection | % Loss 25% Deflection | % Loss 65% Deflection |
|---|---|---|---|---|---|---|
| Dibutyltin Dilaurate | 18.4 | 49.8 | 16.4 | 43.8 | 10.9 | 12.3 |
| Dimethyltin-S,S'-bis(isooctyl | | | | | | |

TABLE III-continued

| | Indentation Load Deflection | | | | % Loss | |
| | Before Heating | | After Heating | | | |
| Gel Catalyst | 25% Deflection | 65% Deflection | 25% Deflection | 65% Deflection | 25% Deflection | 65% Deflection |
|---|---|---|---|---|---|---|
| mercaptoacetate) | 19.6 | 53.3 | 18.3 | 48.8 | 7.2 | 8.6 |

The decrease in load required to maintain a constant level of compression on a foam sample is inversely proportional to the resiliency of the sample. The data demonstrate that the adverse effect of heat on the resiliency of the foam sample prepared using dibutyltin dilaurate was considerably greater than the effect on the sample prepared using one of the present catalysts.

What is claimed is:

1. In a method for improving the oxidative stability of flexible cellular polyurethanes prepared by reacting a polyol containing at least two active hydrogen atoms per molecule, as determined by the Zerewitinoff method, with a stoichiometric excess of a polyfunctional isocyanate, the reaction being conducted in the presence of water as a blowing agent, at least one tertiary amine blowing catalyst, and effective amount of a gel catalyst of the formula $R_a^1SnX_{4-a}$, $(R_3^1Sn)_2S$,

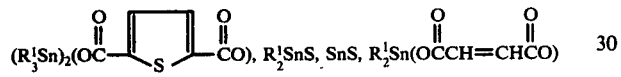

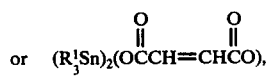

wherein X is a monovalent radical selected from the group consisting of

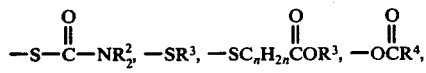

chlorine and bromine, $R^2$ and $R^3$ each represents an alkyl radical containing between 1 and 20 carbon atoms, a cycloalkyl, phenylalkyl, alkylphenyl or a phenyl radical, $R^4$ represents an alkyl radical containing between 1 and 20 carbon atoms, a cycloalkyl, phenyl or a substituted phenyl radical, a represents the integer 1, 2 or 3 and n represents an integer between 1 and 12, inclusive, the improvement consisting essentially of employing a gel catalyst wherein $R^1$ is selected from the group consisting of methyl, allyl, phenyl, and substituted phenyl.

2. The method of claim 1 wherein X is Cl,

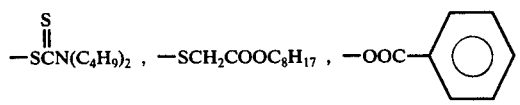

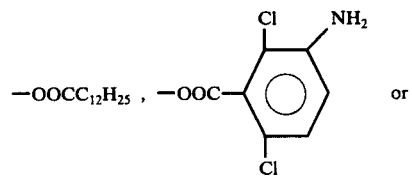

3. The method of claim 1 wherein the gel catalyst is diallyltin maleate, diphenyltin sulfide or bis(triphenyltin)thiophene-2,5-dicarboxylate.

4. The method of claim 1 wherein the concentration of gel catalyst is between 0.005 and 5%, based on the weight of said polyol.

5. The method of claim 1 wherein the blowing catalyst consists essentially of two tertiary amines.

UNITED STATES PATENT OFFICE
CERTIFICATE OF CORRECTION

Patent No. 4,043,949          Dated August 29, 1977

Inventor(s)   KENNETH TREADWELL ET AL.

It is certified that error appears in the above-identified patent and that said Letters Patent are hereby corrected as shown below:

Claim 1 - Delete line 10 and substitute therefor

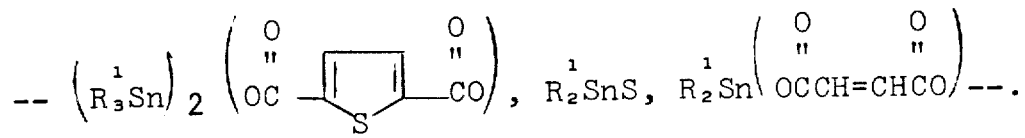

Column 1, line 62 - Delete "residiency" and substitute therefor --resiliency--.

Signed and Sealed this

Twentieth Day of December 1977

[SEAL]

Attest:

RUTH C. MASON  
Attesting Officer

LUTRELLE F. PARKER  
Acting Commissioner of Patents and Trademarks